United States Patent [19]

Denny Clairmont et al.

[11] Patent Number: 5,037,195

[45] Date of Patent: Aug. 6, 1991

[54] SOUND-DAMPING LENS ADAPTER FOR A MOTION-PICTURE CAMERA

[75] Inventors: Denny Clairmont, N. Hollywood; Kenneth W. Robings, Santa Monica, both of Calif.

[73] Assignee: Clairmont Camera, Inc., Studio City, Calif.

[21] Appl. No.: 135,992

[22] Filed: Dec. 21, 1987

[51] Int. Cl.$^5$ ............................................. G03B 31/00
[52] U.S. Cl. .......................................... 352/35; 352/231
[58] Field of Search ................................. 352/35, 231

[56] References Cited

U.S. PATENT DOCUMENTS

| | | | |
|---|---|---|---|
| 4,013,352 | 3/1977 | Monroy | 352/35 |
| 4,121,886 | 10/1978 | Gottschalk | 352/35 |
| 4,536,066 | 8/1985 | Bauer | 352/35 |
| 4,816,857 | 3/1989 | Blascher | 352/35 |

*Primary Examiner*—Monroe H. Hayes
*Attorney, Agent, or Firm*—Ashen Martin Seldon Lippman & Scillieri

[57] ABSTRACT

This adapter is interchangeable with standard non-damping lens-mounting adapters. It reduces the amount of vibration that is transmitted from the camera mechanism to the lens. It thereby reduces the amount of vibration that is retransmitted as objectionable background sound, by radiation from the lens, into a sound stage or other scene area. A vibration-absorbing resilient ring is securely fixed to two substantially rigid rings. A camera mount is secured to one of the rigid rings, for mounting to a camera in a normal position for mounting a standard adapter. A lens attachment is secured to the other rigid ring, for attachment to a lens in a normal position (on the lens) for attaching a standard adapter. The camera mount and the lens attachment both have respective standard-configuration portions, which are spaced apart by a distance that is precisely equal to a standard distance between the respective corresponding portions of a standard adapter. Hence the resilient ring absorbs a fraction of the objectionable noise vibration, deterring that fraction from being transmitted to and radiated from the lens into the scene area—but does so while maintaining a standard distance between the lens and the camera focal plane, and without modification of either the lens or the camera.

23 Claims, 3 Drawing Sheets

SOUND-DAMPING LENS ADAPTER FOR A MOTION-PICTURE CAMERA

BACKGROUND

1. Field of the Invention

This invention relates generally to equipment for sound cinematography; and more particularly to a sound-damping lens adapter for reducing the amount of noise that is radiated from a standard camera and lens into a scene area.

2. Prior Art

In the motion-picture industry it is well known that the operation of a camera movement generates mechanical vibration which can be radiated acoustically as noise. Such noise is objectionable, because it interferes with the recording of sound from the scene area being photographed.

Manufacturers of some motion-picture cameras accordingly design the camera movements to minimize the amount of vibration generated, and also design the camera body or case to absorb as much of the generated vibration as feasible. Unfortunately, however, one route for escape of such vibration is particularly difficult to control.

In particular, vibration is transmitted mechanically from the camera through any conventional lens adapter to a lens. The glass elements of the lens, which are normally exposed to the scene area, radiate some of this vibration.

Lenses are very efficient, unfortunately, in acting as loudspeakers to radiate such noise forward. Except for their relatively mild optical curvature, such lenses have exposed glass surfaces that are essentially vertical, disposed transverse to the optical axis and lens axis.

The frontal surfaces cannot couple transverse vibration (vibration perpendicular to the axis) efficiently into the air as sound. In transverse vibration, the motion is nearly parallel to the surface. When vibrating transversely, in effect, these surfaces merely slide through the air.

For longitudinal vibration, however, the frontal lens surfaces are very efficient in coupling energy into the air In one half-cycle of the mechanical vibration, the entire lens surface 181 (FIG. 4) pushes the air forward, creating a high-pressure wavefront or peak. On another half-cycle the glass surface 181 retreats from the air, creating a low-pressure wavefront or trough.

These pressure variations propagate through the air, away from the lens, while the vibration cycle repeats, radiating a continuous series of pressure waves—noise. The noise problem created in this way is particularly severe for some of the most highly popular modern lenses, such as wide-aperture zoom lenses, that have large-diameter front elements.

The industry has used two different strategies for reducing this noise in the scene area: interception of mechanical vibration before it reaches the lens adapter, and interception of noise after it leaves the lens.

As to the first of these noise-reduction strategies, certain modern camera models commercially available under the trade name Arriflex ® incorporate a built-in vibration filter or sound-damping assembly for attachment of lenses (or, more specifically, for attachment of lens adapters).

Figure 4:
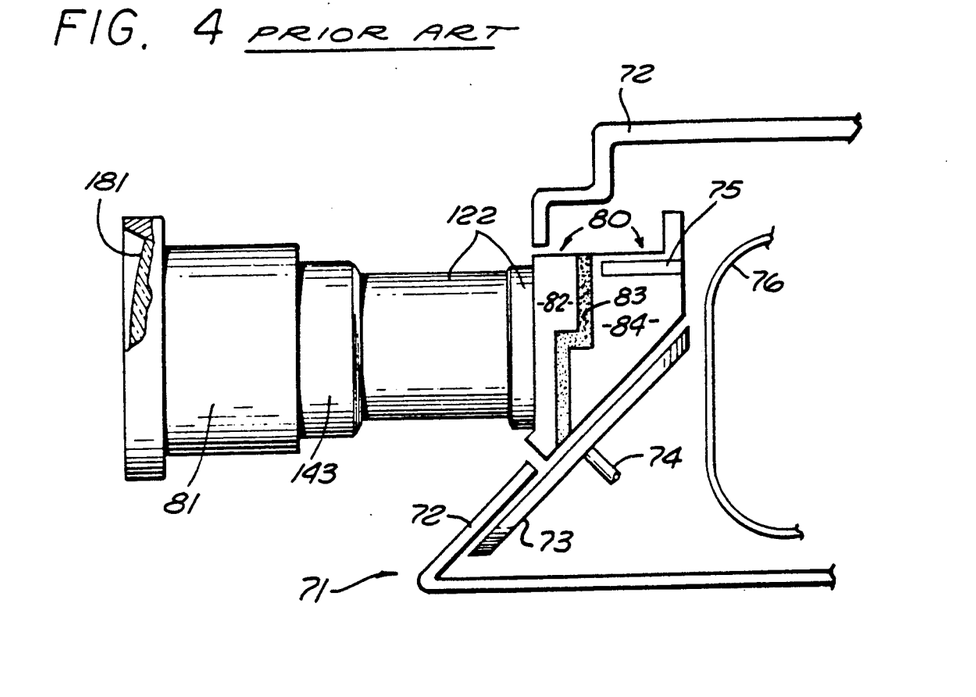
FIG. 4 is a generally schematic side elevation showing in combination an advanced camera, lens and adapter of the prior art, in which the camera includes a built-in sound-damping assembly.
Figure 5:
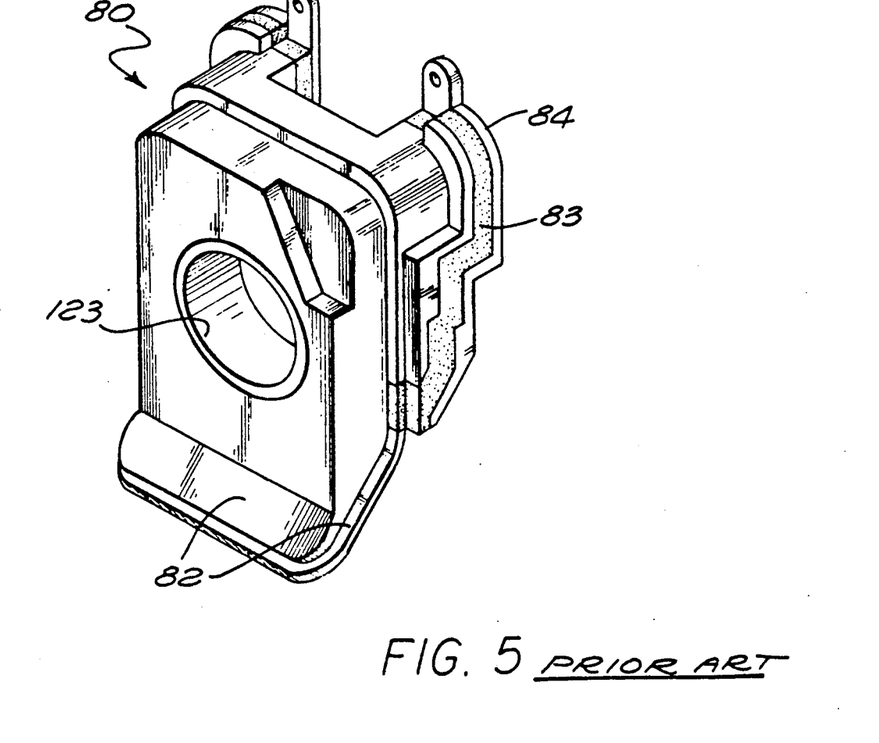
FIG. 5 is a generally isometric view, taken from above and to the front left, of the sound-damping assembly that is built into the FIG. 4 prior-art camera.

The built-in sound-damper assembly 80 (FIGS. 4 and 5) includes a frontal block 82 that is preferably of a relatively heavy metal, and of relatively massive portions. The block 82 is secured to a resilient vibration absorber 83, as shown in FIGS. 4 and 5, and includes a lens-receiving fitting 123 in its forward face.

Such devices must be stabilized against excessive drooping and other uncontrolled motion of the lens relative to the focal plane of the camera. Stabilization and support are enhanced by providing a number of longitudinally oriented support pins or guide pins, which are fixed to the camera mount—that is, fixed to the relatively thin plate 84 at the camera end of the assembly—and which fit closely but smoothly into apertures formed in the rear of the block 82.

The support pins thus slip in a close fit in the apertures defined in the block 82. To put it another way, since it is the pins that are held stationary relative to the camera body 71, the block slips in a close fit on the pins.

Due to their longitudinal orientation, the pins transmit transverse forces between the camera mount and the block 82, and thus provide transverse stabilization and support. (The force of gravity is usually transverse to the lens axis, except for significant camera tilts.) This arrangement does allow transverse vibration to reach the lens 81, but without adverse results: as explained above, transverse vibration does not produce noise efficiently.

The pins do not, however, efficiently transmit forces that are longitudinal. In particular the pins do not efficiently transmit longitudinal vibration. These statements are accurate to the extent that friction between the pins and block can be ignored. Hence the pins do not pass on to the lens the vibration that most directly produces acoustic radiation from an exposed lens surface The only other route for transmission of longitudinal vibration to the lens is through the resilient absorber. The resiliency of the absorber—a relatively hard rubber of durometer fifty—is designed to filter, absorb or "damp" a significant fraction of such vibration.

Through trial and error the resiliency is chosen so that the lens and block 82, by their own inertia, essentially float in a fixed longitudinal position—while the camera mount on the other side of the absorber oscillates. The resilient element expands and contracts to take up the difference. At the same time the pins slip in and out of the apertures in the block 82, giving needed transverse support but transmitting very little longitudinal vibration.

The Arriflex sound-damper assembly 80 is considered feasible because it is protected from the environment.

Even though this first noise-reduction strategy significantly reduces the noise radiated from the lens, important problems persist. First, the residual noise remains objectionably high. Furthermore, other camera models are not readily retrofitted with the built-in damping assembly.

From the drawings of the Arriflex built-in vibration-damper assembly it is possible to guess at one reason that it is not more effective. The noise damper is in a crowded part of the camera. The designers had to work with very difficult space constraints. The solutions are ingenious, but necessarily involve tradeoffs of sound-damping efficacy for various other operating criteria.

Making the frontal block larger and more massive would have improved performance—but not at all in proportion to the added weight or added space employed. The block is already of heavy metal and moderately bulky, and the weight of the block is already augmented by the weight of the adapter and lens.

Making the resilient absorber thicker might have improved performance. Again, however, the improvement probably would have been less than proportional to the added space consumption, and at the cost of severe problems with support and stability.

Therefore a straightforward "upsizing" to increase the damper effectiveness significantly would have required a very large increase in space consumption—almost surely an unacceptable option. Thus the first noise-reduction strategy is inherently limited, at least within the context of generally conventional and standard camera geometries.

As to the second noise-reduction strategy mentioned above, camera accessories called "blimp housings" are available. These housings enclose at least the entire lens—or the entire front end of the camera—so that a mechanically isolated sound-absorbing glass panel can be interposed in front of the lens.

Blimp housings too are effective in reducing noise radiation, but have not gained great acceptance in the industry. They are necessarily very large and cumbersome, interfering with both exchange and manipulation of lenses. Moreover the glass panel is an extra unwanted optical element, an added potential source of bothersome light reflections, scattering and attenuation.

Even the most modern and costly motion-picture cameras are subject to generation of objectionable noise vibration; and the most modern, costly and popular lenses are subject to transmission and radiation of such noise vibration from the camera into a scene area.

SUMMARY OF THE DISCLOSURE

Our invention is a sound-damping adapter for use in place of a standard nondamping adapter in mounting a lens to a motion-picture camera. The invention includes two substantially rigid rings, which we shall distinguish from one another by calling them the "first ring" and the "second ring."

Our invention also must include some means for mounting the first ring to such a camera, substantially outside the camera, in a normal position for mounting a standard adapter. For purposes of generality in expressing our invention, we shall call these means the "mounting means."

The mounting means are secured to the first ring, and include a portion that has a standard configuration of a standard adapter for mounting.

Our invention also includes some means for attaching the second ring to a lens, in a normal position for attachment of such a standard adapter. For generality we shall call these the "attachment means." The attachment means are secured to the second ring and include a portion that has a standard attachment configuration of a standard adapter.

Our invention also includes another ring of a different type, specifically a ring that is resilient and serves to absorb vibration. This vibration-absorbing resilient ring is securely fixed to both the first and second rings.

The respective standard-configuration portions of the mounting means and the attachment means are spaced apart by a distance that is precisely equal to a standard distance between the respective corresponding portions of a standard adapter.

As a result of assembling this combination of components as described, in operation the invention (and in particular the resilient ring) absorbs a fraction of the objectionable noise vibration from the camera. By doing so the invention deters that fraction from being transmitted to and radiated from the lens into the scene area.

The invention accomplishes this, however, while maintaining a standard distance between the lens and the camera focal plane, and without requiring any modification of either the lens or the camera.

In the prior art, as pointed out above, it has been attempted to reduce noise only by intercepting (1) mechanical vibration within the camera, before the vibration could reach the lens adapter, or intercepting (2) airborne noise itself after it has left the glass elements of the lens. Our invention, by contrast, represents a third and new noise-reduction strategy: intercepting mechanical vibration after it has left the camera and entered the lens adapter—but before it reaches the lens.

It is important to realize that this strategy resolves a difficult problem unmastered by the prior art. Vibration-damping equipment takes up space. As is very eloquently expressed by the geometry of the Arriflex ® camera in the area of the sound-damping assembly, and, as already mentioned, space within the front end of the camera is precious.

Designers of the Arriflex camera have done what they could with an exceedingly demanding set of constraints. Our invention consists in part of the recognition that there is another space, heretofore essentially unused, where vibration-damping equipment can be located.

The foregoing may be a description of our invention in its most general or broad terms. In practicing the invention, however, we prefer to incorporate certain advantageous features which simplify or otherwise optimize or enhance either the performance or the economics of the invention—or both.

In particular, we consider it preferable that the resilient ring be sandwiched between the first and second rings.

We also prefer to define or form in one of the two rigid rings a plurality of smooth longitudinal apertures, and to further include a plurality of support pins fastened to the other of the two rings. The support pins project longitudinally through the resilient ring, and slide in a close but smooth fit in the apertures defined in that "other" ring.

In this preferred configuration, the relative longitudinal positioning of the first and second rings is controlled only resiliently, by the resilient ring. The pins (in combination with the resilient ring) fix the relative positioning of the first and second rings transversely only.

From what we have said earlier regarding the Arriflex built-in vibration-absorbing assembly, it will be understood that in our invention, as in the Arriflex apparatus, the combination of resilient ring and pins transmits transverse forces to support and stabilize the lens, while filtering or absorbing a large fraction of longitudinal vibration.

In addition to the summary of our invention just presented, there is another way of broadly conceptualizing our invention. This alternate conceptualization may be regarded as another form or embodiment of the invention. In this view, the invention is a low-noise cinematographic system that includes three elements.

The first of these elements is a substantially conventional motion-picture camera that is subject to generation of objectionable noise vibration. The camera has a substantially conventional built-in sound-damping assembly for attachment of lenses. This built-in assembly includes a massive frontal block that carries a lens-receiving fitting and that is secured to a resilient vibration absorber, for filtering out mechanical vibration and thereby reducing transmission of the camera-generated vibration to such lenses.

The second element is a sound-damping adapter, substantially outside the camera. It is mounted to the lens-receiving fitting of the built-in sound-damping assembly so that the assembly and the adapter together form a multiplicative two-stage filter for noise vibration.

The third element is a substantially conventional lens, mounted to the sound-damping adapter, that radiates a portion of noise vibration which reaches the lens;

In operation of this system, the multiplicative vibration filter formed by the assembly and adapter together minimizes the amount of noise vibration from the camera that reaches the lens. It thereby minimizes the amount of vibration radiated by the lens.

The foregoing operational principles and advantages of the present invention will be more fully appreciated upon consideration of the following detailed description, with reference to the appended drawings, of which:

DETAILED DESCRIPTION OF THE PREFERRED EMBODIMENTS

Figure 1:
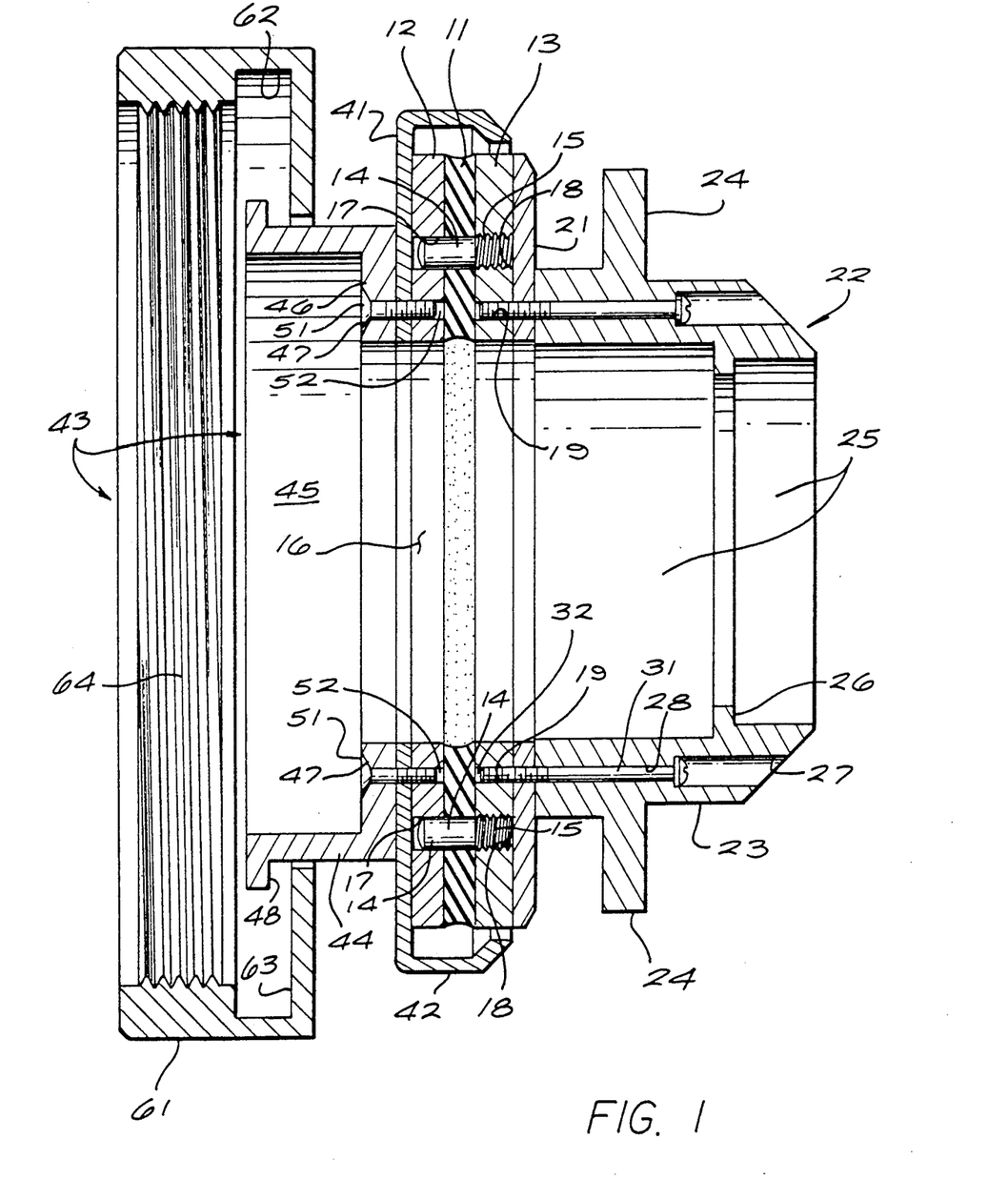
FIG. 1 is a side elevation, mostly in longitudinal section, of a preferred embodiment of our sound-damping adapter invention.
Figure 2:
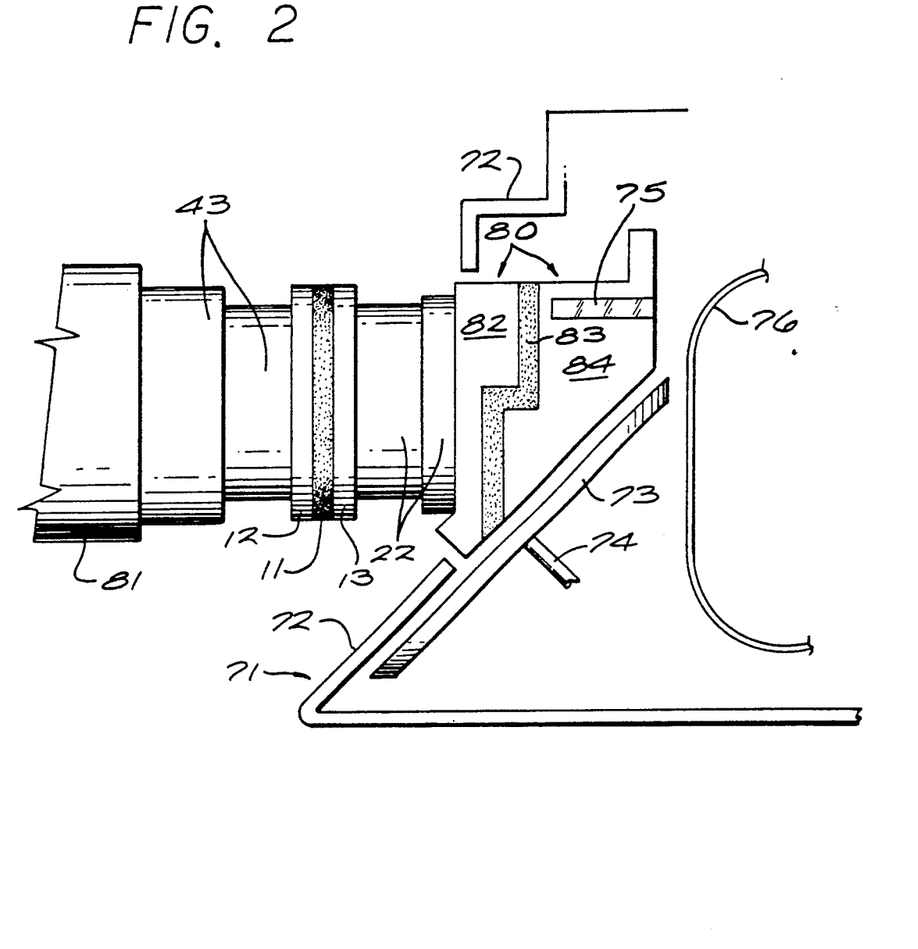
FIG. 2 is a somewhat schematic side elevation of a preferred embodiment of our low-noise cinematographic system invention, with the camera components shown mostly in longitudinal section. This drawing also represents the FIG. 1 adapter embodiment in use with a camera and lens.

As shown in FIGS. 1 and 2, preferred forms of our invention include a resilient vibration-absorbing ring 11.

We use the term "ring" to describe various components of the invention, because conveniently and customarily lens adapters are made very generally circular, with a circular central bore as at 16 for the passage of light from a lens 81 to a camera 71. It is to be understood, however, that in the context of our invention the term "ring" encompasses structures that are noncircular—that is, square, rectangular, polygonal and irregular forms.

The resilient absorber 11 is advantageously sandwiched between two rigid rings 12 and 13. That is not the only possible configuration, however, for our invention: as long as the rings are both securely fixed to the absorber, they need not be in a linear sequence. For example, in principle one rigid ring 13 could be relatively large in diameter, and the other ring 12 could be relatively small and positioned within the first ring 13, on the same side of the absorber 11.

When the absorber 11 is sandwiched between the rigid rings 12 and 13, we prefer to include several smooth apertures 17 bored through one ring 12, and an equal number of support pins or guide pins 14 that are threaded into tapped holes 18 in the other ring 13. The pins 14 extend longitudinally from the tapped holes 18 and fit closely but very smoothly into the bored apertures 17. The pins pass through the resilient ring 11: as will be seen, the resilient ring 11 is cast in place around the pins 14.

The absorber "sandwich" 12-11-13 is protected by covers 21 on the camera side and 41 on the lens side. One of these covers—advantageously the cover 41 on the lens side—is continued in a hood 42 that extends axially toward the other cover 21. The covers 21 and 41, and particularly the hood 42, deter dirt and liquids from reaching and interfering with free oscillation of the resilient ring.

The covers also tend to enclose the resilient ring 11 within an isothermal envelope, and thus help to hold the absorber sandwich at a stable temperature—generally the same temperature as the rest of the adapter. When a modern Arriflex camera model such as the BL-3 or BL-4 is in use, the damper assembly 81 is effectively coupled by the camera mount 22 to at least the rear cover 21.

Secured to a first ring 13 of the two rigid rings, on the camera side of the "sandwich," there may be a bayonet mount 22. This mount has a barrel section 23 and a segmented external flange 24. The mount 22 also has through-holes 28 for passage of securing screws 31, and counterbores 27 at each hole for recessing the screw heads.

The securing screws 31 thread into mating holes in the first ring 13, but are properly sized to leave slight longitudinal clearance as indicated at 32. It is very important to avoid protrusion of these screws 31 into the resilient ring 11, for such protrusion would interfere with free compliance of that ring.

The mount may also have a small internal shoulder 26, which is used in some applications to help position and retain an accessory element (not shown). Such an element may be, for instance, a thin glass window cemented in place and intended to reduce sound radiation directly from the camera movement to the first lens element.

The cover 21, bayonet mount 22, and screws 31 serve as mounting means for mounting the first ring 13 to the camera 71 (FIG. 2). In this way the first ring 13 is mounted outside the camera, in a normal position for mounting a standard adapter—i. e., a conventional nondamping adapter. The bayonet-mount portion 22 of these mounting means, and particularly the segmented flange 24, has a standard configuration, essentially the same as the camera-mounting configuration of a standard adapter.

Secured to a second ring 12 of the two rigid rings, on the lens side of the "sandwich," is a two-piece screw mount 43. This mount has a barrel section 44 with an inward mounting flange 46 adjacent to the hooded cover 41, and an external retaining flange 48.

The screw mount 43 also has countersunk through-holes 47 for passage of securing screws 51. These screws 51 thread into mating holes in the second ring 12. Like the bayonet-mount screws 31 previously discussed, these screws are properly sized to leave slight longitudinal clearance—as indicated at 52. These screws 51 should not protrude into the resilient ring 11.

The second piece of the screw mount 43 is an internally threaded collar 61, with an internal flange 63. The flange 63 engages the retaining flange 48 to retain the collar to the rest of the adapter. Internal threads 64 in the collar 61 mate with external threads (not shown) on the camera end of the lens 81 (FIG. 2), locking the retaining flange 48 firmly against the lens.

The cover 41 and the two-piece screw mount 43 serve as attachment means for attaching the second ring 12 to the lens. In this way the second ring 12 is attached to the lens in a normal position for attaching a standard adapter. The screw-mount portion 43 of these attachment means—particularly the internal threads 64 and the lens-abutting end of the external flange 48—has an essentially standard configuration.

In saying that the mounting means and the attachment means have standard configurations, we do not mean to suggest that the entire geometry of each mount must be standardized. The mounts must be standard only to the extent necessary to properly engage the mating parts of the camera and lens.

The standard-configuration parts of the bayonet mount 22 and screw mount 43 are spaced apart by a distance equal precisely to a standard distance between the respective corresponding portions of a standard adapter. In the embodiment of FIG. 1, the standardized dimension is the distance between the bearing surface of the segmented flange 24 and the forward abutment surface of the retaining flange 48. (The bearing surface of the segmented flange is usually the forward face, more remote from the camera.)

Based upon some experimentation, we prefer to make the resilient ring 11 of an elastomer whose durometer or "Shore" value is approximately forty. This value is significantly softer and more resilient than the rubber used in the Arriflex vibration filter discussed earlier.

The lens side of a vibration filter is preferably as heavy as practical; the frontal block 82 in the Arriflex vibration filter is of tungsten. We prefer, however, to make the second ring 12 of lead. Working with lead is far easier, lead is less costly, and, in combination with the weight of the lens 81, lead is adequately heavy.

We have found it desirable, however, to anchor small threaded inserts (not shown) of hard metal in the second ring 12, to receive the mounting screws 51. Otherwise the screws may shortly pull out of the lead ring, leading to severe lens damage. Steel inserts are satisfactory.

Our adapter invention can be advantageously used in conjunction with any motion-picture camera, once there has been prepared a suitable bayonet mount 22 (or whatever mount type is required). Particular benefits result, however, from using the invention in conjunction with a camera such as the Arriflex ® model BL-3 or BL-4 that already has a built-in sound-damping assembly.

As shown schematically in FIG. 2 and in more detail in FIG. 5, a camera 71 of this type incorporates a sound-damping assembly 80 that includes three main features: a specially contoured mounting plate 84 that is fixed within the camera body, a vibration absorber 83, and a lens-receiving fitting 123 in a massive block 82. The lower rear portion of this three-part structure is relieved to accommodate a rotating shutter 73, motor-driven through a shaft 74.

As shown in FIG. 2, clearance is provided between the outer body 72 of the camera 71 and the rubber-isolated block 82. Contact, if permitted, would reduce or eliminate the effectiveness of the damper assembly 80 as a vibration filter.

Just behind the damping assembly 80 and shutter 73 are the focal plane and film 76. As seen from above, the assembly 80 has a yoke shape, to accommodate the ground glass 75. An annular stainless-steel insert or fitting 123 in the front of the block 82 is specially shaped to receive and firmly engage a standard bayonet mount 122—or the interchangeable bayonet mount 22 of our invention.

The combination structure of FIG. 2 provides a two-stage vibration-filtering action that reduces radiated noise to an extremely low level. The damper assembly 80, consisting of mounting plate 84, rubber element 83, and block 82—together with the mass of a lens 81 and an adapter—forms a single-stage vibration filter. This filter reduces by a first fraction the vibration transmitted from the camera to the adapter.

The adapter 11-12 13-22-43 of our invention, including the bayonet mount 22, first rigid ring 13, resilient absorber 11, second rigid ring 12, and screw mount 43—similarly cooperating with the mass of a lens 81—forms another single-stage vibration filter. This filter reduces by a second fraction the vibration transmitted across the adapter to the lens.

The total vibration reduction produced by the two filters in series is multiplicative. To take a hypothetical example, suppose that a first filter transmitted only thirty percent or three-tenths (0.3) of the vibration reaching it (i. e., reaching the first filter). Also suppose that a second filter transmitted only fifty percent or one-half (0.5) of the vibration reaching it (reaching the second filter).

Then after passing through both filters in series the vibration remaining to affect a lens would be $0.3 \times 0.5 = 0.15$ of the initial value. This value of 0.15 represents only fifteen percent of the vibration that would reach the lens if neither filter were present.

Accurate measurements of noise in this field are somewhat difficult; but wee have made measurements using a decibel meter, and we have made subjective observations. In our resulting adapter configuration we prefer to provide no internal window; and to make the first (camera side) ring of a light metal such as aluminum.

We have also made some measurements using a vibration meter on the lens cap. These tests, however, have produced results inconsistent with the decibel-meter and subjective observations mentioned above; we are therefore disregarding the measured vibration values. Possibly they represent vibration in the transverse direction, vibration which our invention is not designed to attenuate effectively.

The resilient ring is self-bonded to the first and second rings by application of pressure and heat, as will be described below. The support pins are of a material resistant to pressure and heat at the pressures and temperatures used for bonding of the resilient ring. We have found it satisfactory to make the pins of a homopolymer acetal resin that is available commercially under the trade name Delrin.

Figure 3:
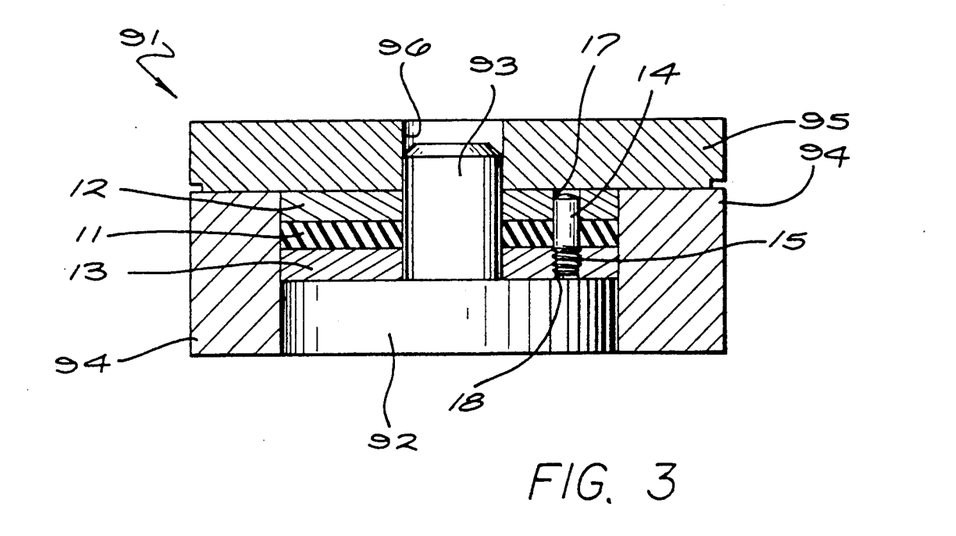
FIG. 3 is a schematic elevation of fabrication tooling and arrangements for forming the resilient absorber of FIGS. 1 and 2.

As shown in FIG. 3, the resilient ring 11 can be self-bonded to the two rigid rings 12, 13 in a jig 91 that includes a circular base 92, whose diameter equals the outside diameters of the two rigid rings 12, 13. Extending upward from the base 92 is a central column or mandrel 93, whose diameter fits closely through the inside diameters of the two rigid rings 12, 13.

An outer cylinder 94 closely encircles the base 92 and rigid rings 12, 13, and a pressure plate 95 caps the cylinder. An aperture 96 in the pressure plate 95 fits closely around the mandrel 93. The height of the outer cylinder 94 in relation to the height of the base 92 is chosen to limit the compression of the metal-and-rubber sandwich 12-11-13, and thereby to control the overall finished thickness of the sandwich.

The first ring 13, which will be part of the camera side of the sandwich as previously mentioned, is preferably of aluminum, such as the type commonly designated 6061 T6; it is sandblasted on the face that will adhere to the resilient ring 11. The second rigid ring 12, which will be part of the lens side as also previously mentioned, is preferably of a hard lead alloy, such as six-percent antimony added to lead, also sandblasted on the face that will contact the resilient ring 11.

In preparation for forming the resilient ring 11, the support or guide pins 14 are threaded into the first ring 13, and the side of that ring which will contact the elastomer is coated with bonding agent Chemlock manufacture. So that the finished elastomer will be able to expand and contract independently of the pins 14, it is desirable to avoid placing adhesive on the pins. A release compound can be coated lightly on the pins 14.

The first ring 13, with the pins 14 extending upward from the adhesive-coated side, is then slid over the mandrel 93 and into the outer cylinder 94 until the first ring 13 rests on the base 92.

Next a measured amount of elastomer such as forty-Shore black neoprene is placed in the annular space between the mandrel 93 and the outer cylinder 94, above the first ring 13. The elastomer is conveniently and usually inserted in the form of chunks.

The side of the second ring 12 that will face the resilient ring 11 is then similarly coated with bonding agent and fitted over the mandrel 93 and into the outer cylinder 94.

The two rigid rings 12, 13 must be carefully aligned so that the pins 14 will slip smoothly within the apertures 17 in the first ring 12. This condition is satisfied by starting the pins 14 into the apertures 17 before the pressure plate 95 is positioned—a straightforward step if the chunks of elastomer are thin enough.

The pressure plate 95 is then lowered as by a hydraulic ram (not shown), with pressure up to approximately 2 MPa (300 pounds per square inch), while the temperature of the jig 91 and its contents is raised to approximately 175° C. (350° F.). The pressure and temperature are maintained for roughly 5 to 10 minutes. Then the tooling is cooled and the pressure plate released. This procedure forms the rubber into an adequately homogeneous mass 11 that is sealed to both metal rings 12, 13.

We prefer to make each rigid ring 2.75 inches in outside diameter, 1.625 inches in inside diameter, and 0.172 inch thick. Six threaded holes 19 (FIG. 1) are spaced around the inner periphery of each ring, preferably on a 1.875-inch circle, to receive 4-40 machine screws—the securing screws 31 and 51 of FIG. 1. In the lead ring 12, as mentioned earlier, a strengthening modification of this scheme is desirable. Larger, tapered inserts of a harder metal such as steel, internally threaded, are anchored in the second ring to threadingly receive the securing screws 51. Mount 22 and screw lens attachment 43 shown in FIG. 1 are designed to interchange with a mount that is commercially available under the trade name "PL," for use with a 20-to-120-mm zoom lens available under the name Angenieux.

Configurations and dimensions of these components, and of equivalent fittings for other cameras or lenses, can be found by measurement of production units. It may be possible to obtain these fittings as custom variants from makers of the corresponding standard nondamping adapters.

It will be understood that the foregoing disclosure is intended to be merely exemplary, and not to limit the scope of the invention—which is to be determined by reference to the appended claims.

We claim:

1. A sound-damping adapter for use in place of a standard nondamping adapter in mounting a lens to a motion-picture camera, such a camera being subject to generation of objectionable noise vibration, and such a lens being subject to transmission and radiation of such noise vibration from the camera into a scene area; and adapter comprising:

a first substantially rigid ring;

mounting means, secured to the first ring, for mounting the first ring to such a camera, substantially outside such camera, in a normal position for mounting such a standard adapter; said mounting means including a portion that has a standard configuration of such a standard adapter for such mounting;

a second substantially rigid ring;

attachment means, secured to the second ring, for attaching the second ring to such a lens, in a normal position for attachment of such a standard adapter; said attachment means including a portion that has a standard configuration of such a standard adapter for such attachment;

a vibration-absorbing resilient ring securely fixed to the first and second rings and deterring transmission of vibration from the first ring to the second ring;

the respective standard-configuration portions of the mounting and attachment means being spaced apart by a distance that is precisely equal to a standard distance between the respective corresponding portions of such a standard adapter;

wherein in operation the resilient ring absorbs a fraction of such objectionable noise vibration, deterring such fraction from being transmitted from the normal standard-adapter mounting position to such lens, and from being radiated from such lens into such scene area, but while maintaining a standard distance between such lens and such camera focal plane and without requiring any modification of either such lens or such camera.

2. The adapter of claim 1, wherein:

the resilient ring is sandwiched between the first and second rings.

3. The adapter of claim 2:

wherein one of the two rigid rings defines a plurality of smooth longitudinal apertures;

further comprising a plurality of support pins fastened to the other of the two rigid rings, projecting longitudinally through the resilient ring, and sliding longitudinally in a close but smooth fit in the apertures defined in said one rigid ring;

wherein the relative longitudinal positioning of the rigid rings is controlled only resiliently by the resilient ring; and wherein the support pins and the resilient ring in combination fix the relative positioning of the rigid rings only transversely.

4. The adapter of claim 3, wherein:
the resilient ring is of an elastomer whose durometer is approximately forty;
the second ring is of a relatively heavy metal;
the attachment means include threaded inserts of a hard metal such as steel, anchored in the second ring, to threadingly receive mounting screws passed through the attachment means;
the resilient ring is self-bonded to the first and second rings by application of pressure and heat; and
the support pins are of a material that is resistant to pressure and heat at the pressures and temperatures used for said bonding; and
further comprising first and second securing means for securing the mounting and attachment means to the first and second rings respectively, the securing means being configured so that they do not significantly press into the elastomer of the resilient ring.

5. The adapter of claim 4, wherein:
the second ring is of lead; and
the support pins are of the acetal resin available commercially under the trade name Delrin.

6. The adapter of claim 1, for use with such a camera that has a built-in sound-damping assembly for attachment of lenses; such built-in assembly including a block that has a lens-receiving fitting secured to a resilient vibration absorber; and wherein:
the mounting means are particularly configured for mounting to such built-in sound-damping assembly so that the assembly and the adapter together form a multiplicative two-stage filter for sound vibration;
whereby in operation such objectionable sound vibration is attenuated in two multiplicative stages to a particularly low residual level.

7. The adapter of claim 3, for use with such a camera that has a built-in sound-damping assembly for attachment of lenses; such built-in assembly including a block that has a lens-receiving fitting and is secured to a resilient vibration absorber, and that is supported by a plurality of support pins which are fixed to the camera and slip in a close but smooth fit in apertures defined in the block; and wherein:
the mounting means are particularly configured for mounting to such built-in sound-damping assembly so that the assembly and the adapter together form a multiplicative two-stage filter for sound vibration;
whereby in operation such objectionable sound vibration is attenuated in two multiplicative stages to a particularly low residual level.

8. The adapter of claim 4, for use with such a camera that has a built-in sound-damping assembly for attachment of lenses; such built-in assembly including a block of a relatively heavy metal, that has a lens-receiving fitting and is secured to a resilient vibration absorber, and that is supported by a plurality of support pins which are fixed to the camera and slip in a close but smooth fit in apertures defined in the block; and wherein:
the mounting means are particularly configured for mounting to such built-in sound-damping assembly so that the assembly and the adapter together form a multiplicative two-stage filter for sound vibration;
whereby in operation such objectionable sound vibration is attenuated in two multiplicative stages to a particularly low residual level.

9. The adapter of claim 1, in combination with: such camera.

10. The adapter of claim 3, in combination with: such camera.

11. The adapter of claim 4, in combination with: such camera.

12. The adapter of claim 6, in combination with: such camera.

13. The adapter of claim 1, in combination with:
such lens, in the form of a zoom lens having a relatively large forwardmost optical element that is particularly subject to efficient transmission into such scene area of any such sound vibration that reaches the zoom lens;
wherein the absorption of such noise by the resilient ring, before such noise reaches the zoom lens, minimizes radiation of such objectionable noise vibration into such scene area despite efficient transmission by the zoom lens.

14. The adapter of claim 3, in combination with:
such lens, in the form of a zoom lens having a relatively large forwardmost optical element that is particularly subject to efficient transmission, into such scene area, of longitudinal sound vibration that reaches the zoom lens;
wherein partial mechanical isolation of the first and second rings by the resilient ring, with respect to relative longitudinal vibration, and the partial absorption of such longitudinal noise vibration by the resilient ring before such vibration reaches the zoom lens, minimize radiation of such objectionable noise into such scene area despite efficient transmission and radiation by the zoom lens; and
wherein fixed mutual positioning of the first and second rings by the support pins and resilient ring in combination, with respect to relative transverse motion, maintains optical alignment of the zoom lens relative to the camera.

15. The adapter of claim 4, in combination with:
such lens, in the form of a zoom lens having a relatively large forwardmost optical element that is particularly subject to efficient transmission into such scene of area of any such sound vibration that reaches the zoom lens;
wherein mechanical isolation of the first and second rings by the resilient elastomeric ring, and the absorption of such noise by the resilient elastomeric ring before such noise reaches the zoom lens, minimize radiation of such objectionable noise vibration into such scene area despite efficient transmission by the zoom lens; while mutual orientation of the first and second rings by the resilient elastomeric ring and support pins maintains optical alignment of the zoom lens relative to the camera.

16. The adapter of claim 6, in combination with:
such lens, in the form of a zoom lens having a relatively large forwardmost optical element that is particularly subject to efficient transmission into such scene of area of any such sound vibration that reaches the zoom lens;
wherein radiation of such objectionable noise vibration into such scene area is minimized by the multiplicative two-stage attenuation despite efficient transmission by the zoom lens.

17. The adapter of claim 7, in combination with:

such lens, in the form of a zoom lens having a relatively large forwardmost optical element that is particularly subject to efficient transmission into such scene of area of any such sound vibration that reaches the zoom lens;

whereby radiation of such objectionable noise vibration into such scene area is minimized by the multiplicative two-stage attenuation despite efficient transmission by the zoom lens.

18. A low-noise cinematographic system comprising:

a substantially conventional motion-picture camera that is subject to generation of objectionable noise vibration, and that has a substantially conventional built-in sound-damping assembly for attachment of lenses; the built-in assembly including a block that has a lens-receiving fitting and is secured to a resilient vibration absorber, for reducing transmission of the camera-generated vibration to such lenses;

a sound-damping adapter, substantially outside the camera, mounted to the lens-receiving fitting of the built-in sound-damping assembly so that the assembly and the adapter together form a multiplicative two-stage filter for noise vibration; and a substantially conventional lens, mounted to the sound-damping adapter, that radiates a portion of noise vibration which reaches the lens;

whereby in operation the multiplicative vibration filter formed by the assembly and adapter together minimizes the amount of such noise vibration from the camera that reaches the lens, and so minimizes the amount of vibration radiated by the lens.

19. The system of claim 18, wherein:

the lens is a zoom lens with a relatively large forwardmost optical element that is particularly efficient in radiating vibration into a scene area that is being photographed; and the multiplicative vibration filter reduces the amount of noise vibration reaching the lens from the camera, and therefore the radiated noise vibration, to an acceptable residual level despite the efficiency of the lens in radiating such noise.

20. The system of claim 18, wherein the adapter comprises:

a first substantially rigid ring;

mounting means, secured to the first ring, for mounting the first ring to the lens-receiving fitting, substantially outside the camera;

a second substantially rigid ring;

attachment means, secured to the second ring, for attaching the second ring to such a lens; and a vibration-absorbing resilient ring, securely fixed to the first and second rings, for absorbing a fraction of such noise vibration generated by the camera and affecting the lens-receiving fitting, and so deterring the fraction from being transmitted to the lens.

21. The system of claim 20, wherein the lens has conventional standard focal properties establishing a required distance between the lens and a focal plane within the camera; and wherein:

the sound-damping adapter is sized and configured to replace a conventional nondamping adapter and is mounted to the camera lens-receiving fitting, without modification of the camera or fitting, in a normal position for mounting such a conventional adapter;

the mounting means include a portion that has a standard configuration of such a standard adapter for such mounting;

the sound-damping adapter is attached to the lens, without modification of the lens, in a normal position for attachment of such a conventional adapter;

the attachment means include a portion that has a standard configuration of such a standard adapter for such attachment; and the respective standard-configuration portions of the mounting and attachment means are spaced apart by a distance that is precisely equal to a standard distance between the respective corresponding portions of such a standard adapter;

whereby the sound-damping adapter reduces the amount of noise vibration radiated from the lens into a scene area, while maintaining a standard distance between the lens and the camera focal plane and without any modification of either the lens or the camera.

22. The system of claim 21, wherein:

at least one of the two rigid rings is of a relatively heavy metal and defines a plurality of smooth longitudinal apertures;

the sound-damping adapter further comprises a plurality of support pins fastened to the other of the two rigid rings, projecting longitudinally through the resilient ring, and sliding longitudinally in a close but smooth fit in the apertures defined in said one rigid ring;

wherein the relative longitudinal positioning of the rigid rings is controlled only resiliently by the resilient ring; and wherein the support pins and the resilient ring in combination fix the relative positioning of the rigid rings only transversely.

23. The adapter of claim 22, wherein:

the resilient ring is of an elastomer whose durometer is approximately forty;

the second ring is of a relatively heavy metal;

the second securing means include threaded inserts of a hard metal such as steel, anchored in the second ring, to threadingly receive mounting screws passed through the attachment means;

the resilient ring is self-bonded to the first and second rings by application of pressure and heat; and the support pins are of a material that is resistant to pressure and heat at the pressures and temperatures used for said bonding; and the sound-damping adapter further comprises first and second securing means for securing the mounting and attachment means to the first and second rings respectively, the securing means being configured so that they do not significantly press into the elastomer of the resilient ring.

* * * * *